United States Patent
Hikazudani et al.

(10) Patent No.: US 8,801,915 B2
(45) Date of Patent: Aug. 12, 2014

(54) METHOD FOR SYNTHESIZING AMMONIA

(75) Inventors: Susumu Hikazudani, Osaka (JP); Takuma Mori, Osaka (JP); Sadao Araki, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 13/809,677

(22) PCT Filed: Jun. 3, 2011

(86) PCT No.: PCT/JP2011/062790
§ 371 (c)(1),
(2), (4) Date: Jan. 11, 2013

(87) PCT Pub. No.: WO2012/011324
PCT Pub. Date: Jan. 26, 2012

(65) Prior Publication Data
US 2013/0112568 A1    May 9, 2013

(30) Foreign Application Priority Data
Jul. 21, 2010   (JP) ................................. 2010-163537

(51) Int. Cl.
*C01C 1/02*    (2006.01)
(52) U.S. Cl.
USPC ......................................................... 205/340
(58) Field of Classification Search
CPC .......... B01J 35/004; C25B 1/003; C01C 1/02; C01C 1/0411
USPC ......................................................... 205/340
See application file for complete search history.

(56) References Cited

U.S. PATENT DOCUMENTS

| 4,167,461 A | 9/1979 | Dickson et al. |
| 8,236,146 B2 * | 8/2012 | Nomura et al. ............... 205/340 |
| 2010/0133110 A1 * | 6/2010 | Nocera et al. ................. 205/340 |
| 2010/0143811 A1 * | 6/2010 | Brimblecombe et al. .... 205/340 |

FOREIGN PATENT DOCUMENTS

| JP | 2001-072985 A | 3/2001 |
| JP | 2003-200057 A | 7/2003 |
| JP | 2005-272856 A | 10/2005 |
| JP | 2009-084615 A | 4/2009 |
| JP | 2010-030870 A | 2/2010 |

OTHER PUBLICATIONS

Grayer et al, "Electrochemical and photoelectrochemical reduction of molecular nitrogen to ammonia," J. Electroanal. Chem., 170 (1984), pp. 363-368.*

(Continued)

*Primary Examiner* — Keith Hendricks
*Assistant Examiner* — Colleen M Raphael
(74) *Attorney, Agent, or Firm* — Edwards Wildman Palmer LLP; James E. Armstrong, IV; Nicholas J. DiCeglie, Jr.

(57) ABSTRACT

In the ammonia synthesis method, an anode and a cathode are arranged in an electrolyte phase at a predetermined interval; water ($H_2O$) is supplied to an anode zone and light is radiated so that water is decomposed by a photoabsorption reaction to generate protons ($H^+$), electrons ($e^-$), and an oxygen gas ($O_2$); a nitrogen gas ($N_2$) is supplied to a cathode zone, and the electrons ($e^-$) generated in the anode zone are allowed to transfer to the cathode zone through a lead, thereby generating $N^{3-}$ in the cathode zone; and ammonia ($NH_3$) is synthesized through the reaction between the protons ($H^+$) that have moved toward the cathode zone from the anode zone in the electrolyte phase and $N^{3-}$.

5 Claims, 1 Drawing Sheet

(56) References Cited

OTHER PUBLICATIONS

Schrauzer, "Ammonia Synthesis in Solar Cells," Naturwissenschaften 65 (1978) pp. 205-206.*

Halmann, "Electrochemical reduction of molecular nitrogen to ammonia in aqueous alkali; a re-examination," J. Electroanal. Chem. 181 1984), pp. 307-308.*

Ileperuma et al, "Photoreduction of nitrogen and water on montmorillonite clays loaded with hydrous ferric oxide," J. Photochem. Photobio. A: Chem; 59 (1991) pp. 191-197.*

Schiavello (ed.) Photoelectrochemistry, Photocatalysis, and Photoreactors, NATO ASI Series, vol. 146, pp. 503-519 (1985).*

Memming, Photoelectrochemical Solar Energy Conversion, Electrochemistry II, Topics in Current Chemistry vol. 143, 1988, pp. 79-112.*

Schrauzer et al, "Photolysis of water and photoreduction of nitrogen on titanium dioxide," J. Am. Chem. Soc., 99:22, Oct. 26, 1977, pp. 7189-7193.*

International Search Report dated Jul. 26, 2011, issued for PCT/JP2011/062790.

* cited by examiner

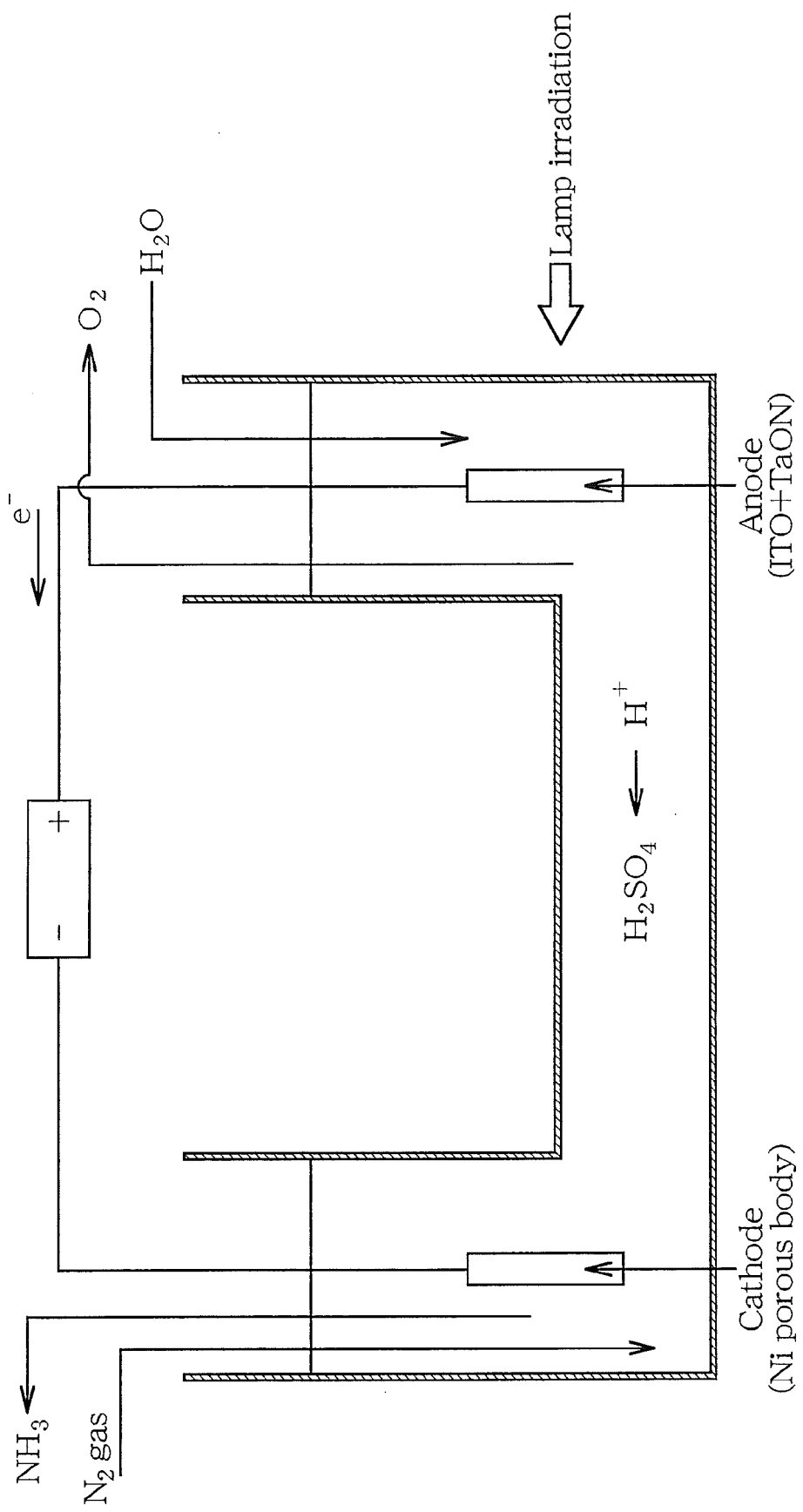

METHOD FOR SYNTHESIZING AMMONIA

TECHNICAL FIELD

The present invention relates to a method for synthesizing ammonia, and more particularly to a method for synthesizing ammonia which is capable of synthesizing ammonia without using a hydrogen gas.

BACKGROUND ART

Conventional ammonia synthesis processes use fossil fuels such as a natural gas as a hydrogen source that is a raw material for synthesis. Therefore, a rise in the ammonia production cost due to a steep rise in fossil fuel prices as well as environmental load due to carbon dioxide ($CO_2$) emissions have been a problem.

As a method for producing hydrogen without using fossil fuels, there are an electrolytic method using electrolysis of water, a photocatalytic degradation method for water by solar light, and a thermochemical method using solar heat and nuclear energy.

The Haber-Bosch process has been employed as a method for synthesizing ammonia using hydrogen. Here, the Haber-Bosch process is a method for synthesizing ammonia from a hydrogen gas and a nitrogen gas, and produces ammonia by reacting a hydrogen gas with a nitrogen gas in the presence of an iron-based three-way catalyst.

The Haber-Bosch process is the mainstream of ammonia synthesis methods even at present because of its high synthesis efficiency, but the process has problems in that energy consumption and facility scale required are large because the process performs synthesis under high temperature and high pressure conditions, and that a large quantity of carbon dioxide ($CO_2$) is emitted in obtaining a hydrogen gas by steam reforming of hydrocarbons.

A method that does not require a hydrogen gas has been developed as a method for solving the above problems, and patent documents relating to such an ammonia synthesis method are as follows.

First, an electrolytic ammonia synthesis apparatus disclosed in Patent Document 1 below is an apparatus for synthesizing ammonia from water and nitrogen, wherein the kind of steam to be supplied to an electrolytic bath and the means to agitate the electrolytic bath are devised. This electrolytic ammonia synthesis apparatus is characterized in that it is (1) an apparatus for synthesizing ammonia by supplying refined steam and $N^{3-}$ to a molten salt being an electrolytic bath, and includes (2) a means for supplying a gaseous component to the molten salt and agitating the molten salt by a rising stream of the molten salt containing the gaseous component, (3) an anode to generate an oxygen gas by oxidizing $O^{2-}$ produced by the reaction of steam, and (4) a cathode to generate $N^{3-}$ by the reduction of a nitrogen gas.

Here, the molten salt is at least one member selected from the group consisting of alkali metal halides and alkaline earth metal halides. In addition, the refined steam has a bubble diameter of 100 nm to 10 mm. Moreover, the refined steam is supplied so that the number of bubbles per 1 $cm^3$ of the molten salt becomes 10 to 10000000.

Next, an ammonia synthesis apparatus disclosed in Patent Document 2 below is characterized by including a mesh-like or porous cathode to which a nitrogen gas is supplied, a nitride solid electrolyte layer on the cathode, a mesh-like or porous anode provided on the nitride solid electrolyte layer, and a catalyst layer provided on the anode for adsorption and dissociation of hydrogen, and in which nitrogen negative ions are electrochemically generated in the nitride solid electrolyte layer by applying to the anode a positive electric potential with respect to the cathode; atomic nitrogen is obtained at the anode by oxidizing the nitrogen negative ions; and ammonia is synthesized at the anode by reacting atomic nitrogen with atomic hydrogen to be adsorbed and dissociated on the catalyst layer.

Patent Document 1: JP 2009-84615
Patent Document 2: JP 2005-272856

SUMMARY OF THE INVENTION

Problems to be Solved by the Invention

However, since the ammonia synthesis apparatus disclosed in Patent Document 1 uses an electrolytic bath of a molten salt made from an alkali metal halide and an alkaline earth metal halide, the ammonia synthesis performed under a high temperature still has a problem that consumption of the energy is very large. In addition, the ammonia synthesis apparatus described in Patent Document 2 can not solve the problem of use of a fossil fuel because a hydrogen gas must be supplied as a hydrogen source.

An object of the present invention is to solve the above problems of the prior art, and to provide a synthesis method for ammonia, which is capable of synthesizing ammonia without using a hydrogen gas, is free from a rise in the ammonia production cost due to a steep rise of fossil fuel prices and from environmental load due to carbon dioxide ($CO_2$) emissions since the method does not use fossil fuels such as a natural gas as a conventional hydrogen source, and is excellent in economy because energy consumption and facility scale required are small since the synthesis is performed at a normal temperature under a normal pressure.

Means for Solving the Problems

As a result of intensive studies in view of the above problems, the present inventors have found that ammonia is synthesized by irradiating water with light in an anode zone to generate protons, electrons, and an oxygen gas due to decomposition of water by a photoabsorption reaction, allowing to transfer the electrons to a cathode zone to which a nitrogen gas is to be supplied to generate $N^{3-}$ in the cathode zone, and reacting this $N^{3-}$ with the protons from the anode zone, thereby completed the present invention.

In order to achieve the above object, the invention of an ammonia synthesis method in accordance with claim 1 is characterized in that an anode and a cathode are arranged in an electrolyte phase at a predetermined interval; water ($H_2O$) is supplied to an anode zone and light is radiated so that water is decomposed by a photoabsorption reaction to generate protons ($H^+$), electrons ($e^-$), and an oxygen gas ($O_2$); a nitrogen gas ($N_2$) is supplied to a cathode zone, and the electrons ($e^-$) generated in the anode zone are allowed to transfer to the cathode zone through a lead, thereby generating $N^{3-}$ in the cathode zone; and ammonia ($NH_3$) is synthesized through the reaction between the protons ($H^+$) that have moved toward the cathode zone from the anode zone in the electrolyte phase and $N^{3-}$.

The invention of claim 2 is the ammonia synthesis method as claimed in claim 1, characterized in that a photocatalyst is provided to the anode and light is radiated to the anode zone so that a photocatalytic reaction takes place to decompose water, thereby generating protons, electrons, and an oxygen gas.

The invention of claim 3 is the ammonia synthesis method as claimed in claim 1 or 2, characterized in that the light to be radiated to the anode zone is solar light, or visible light emitted from a light irradiation lamp.

Effect of the Invention

The invention of an ammonia synthesis method as claimed in claim 1 is characterized in that an anode and a cathode are arranged in an electrolyte phase at a predetermined interval; water ($H_2O$) is supplied to an anode zone and light is radiated so that water is decomposed by a photoabsorption reaction to generate protons ($H^+$), electrons (e−), and an oxygen gas ($O_2$); a nitrogen gas ($N_2$) is supplied to a cathode zone, and the electrons ($e^-$) generated in the anode zone are allowed to transfer to the cathode zone through a lead, thereby generating $N^{3-}$ in the cathode zone; and ammonia ($NH_3$) is synthesized through the reaction between the protons ($H^+$) that have moved toward the cathode zone from the anode zone in the electrolyte phase and $N^{3-}$. In accordance with the invention of claim 1, it is possible to synthesize ammonia without using a hydrogen gas. Therefore, the present invention exerts effects that the method is free from a rise in the ammonia production cost due to a steep rise of fossil fuel prices and from environmental load due to carbon dioxide ($CO_2$) emissions since the method does not use fossil fuels such as a natural gas as a conventional hydrogen source, as well as that the method is excellent in economy because energy consumption and facility scale required are small since the synthesis is performed at a normal temperature under a normal pressure.

The invention as claimed in claim 2 is the ammonia synthesis method as claimed in claim 1, characterized in that a photocatalyst is provided to the anode and light is radiated to the anode zone so that a photocatalytic reaction takes place to decompose water, thereby generating protons, electrons, and an oxygen gas. In accordance with the invention of claim 2, an effect is exhibited that it is possible to synthesize ammonia with high efficiency by using a photocatalyst because the water decomposition reaction proceeds fast.

The invention as claimed in claim 3 is the ammonia synthesis method as claimed in claim 1 or 2, characterized in that the light to be radiated to the anode zone is solar light, or visible light emitted from a light irradiation lamp. In accordance with the invention of claim 3, again an effect is exhibited that it is possible to synthesize ammonia with high efficiency by using solar light, or visible light emitted from a light irradiation lamp because such light has a highest energy so that the water decomposition reaction proceeds fast with the light.

BRIEF DESCRIPTION OF THE DRAWING

FIG. 1 is a flow sheet showing an embodiment of an apparatus for performing the ammonia synthesis method according to the present invention.

MODE FOR CARRYING OUT THE INVENTION

Next, an embodiment of the present invention will be explained with reference to the drawing, but the present invention is not limited thereto.

FIG. 1 shows a specific example of an apparatus for performing the ammonia synthesis method according to the present invention. Referring to the drawing, in the ammonia synthesis method of the present invention, an anode and a cathode are arranged in an electrolyte phase at a predetermined interval.

In an anode zone, water ($H_2O$) is supplied and light is radiated so that a photoabsorption reaction takes place to decompose water, thereby generating protons ($H^+$), electrons ($e^-$), and an oxygen gas ($O_2$).

In a cathode zone, a nitrogen gas ($N_2$) is supplied; the electrons ($e^-$) generated in the anode zone are allowed to transfer to the cathode zone through a lead, thereby generating $N^{3-}$ in the cathode zone; and ammonia ($NH_3$) is synthesized through the reaction between the protons ($H^+$) that have moved toward the cathode zone from the anode zone in the electrolyte phase and $N^{3-}$.

In the ammonia synthesis method according to the present invention, the chemical reactions in the anode zone and the cathode zone are as follows:

Anode reaction: $H_2O + h\nu \rightarrow 1/2 O_2 + 2H^+ + 2e^-$

Cathode reaction: $N_2 + 6e^- \rightarrow 2N^{3-}$

: $N^{3-} + 3H^+ \rightarrow NH_3$

According to the ammonia synthesis method of the present invention, it is possible to synthesize ammonia without using a hydrogen gas. In addition, the method is free from a rise in the ammonia production cost due to a steep rise of fossil fuel prices as well as environmental load due to carbon dioxide ($CO_2$) emissions since the method does not use fossil fuels such as a natural gas as a conventional hydrogen source, and the method is also excellent in economy because energy consumption and facility scale required are small since the synthesis is performed at a normal temperature under a normal pressure.

In the ammonia synthesis method of the present invention, it is preferable that a photocatalyst is provided to the anode and light is radiated to the anode zone so that a photocatalytic reaction takes place to decompose water, thereby forming protons, electrons, and an oxygen gas.

Here, it is preferable to use an anode substrate made of indium tin oxide (ITO), fluorine tin oxide (FTO), or the like.

In addition, it is preferable to use, as an anode, for example, a Ni porous body, a nickel-, iron-, or ruthenium-loaded Ni porous body, carbon paper, or nickel-, iron-, or ruthenium-loaded carbon paper.

The photocatalyst may be a so-called visible light-responsive photocatalyst so long as it exerts a photocatalytic activity with visible light. Such a visible light-responsive photocatalyst may be, for example, an oxynitride compound typified by TaON, $LaTiO_2N$, $CaNbO_2N$, $LaTaON_2$, or $CaTaO_2N$; an oxysulfide compound typified by $Sm_2Ti_2S_2O_7$; or an oxide containing metal ions of $d^{10}$ electron state, which is typified by $CaIn_2O_4$, $SrIn_2O_4$, $ZnGa_2O_4$, or $Na_2Sb_2O_6$.

By using these photocatalysts, the water decomposition reaction proceeds fast, thereby enabling to produce ammonia with high efficiency.

In the ammonia synthesis method according to the present invention, it is preferable that light to be radiated in an anode zone is solar light, or visible light emitted from a light irradiation lamp. Here, as the light irradiation lamp, for example, a xenon lamp or a krypton lamp is preferably used. Again, ammonia can be synthesized with high efficiency by using such visible light because the light has the highest energy, and the water decomposition reaction proceeds fast.

EXAMPLES

Hereinafter, an example of the present invention will be explained, but the present invention is not limited thereto.

Example 1

First, 0.002 N aqueous solution of sulfuric acid ($H_2SO_4$) was used as an electrolyte of an electrolyte phase. Indium tin oxide (ITO) was used as a substrate for an anode, and a visible light-responsive photocatalyst TaON as a photocatalyst was loaded onto an ITO substrate by application. In addition, a Ni porous body was used as a cathode.

Then, in the electrolyte phase, the anode provided with the photocatalyst and the cathode were arranged at a predetermined interval, and visible light was radiated at 300 W with a xenon lamp in an anode zone while supplying water ($H_2O$). By this procedure, water was decomposed by a photocatalytic reaction in the anode zone, thereby generating protons ($H^+$), electrons ($e^-$) and an oxygen gas ($O_2$).

Meanwhile, a nitrogen gas ($N_2$) was circulated at a flow rate of 100 ml/min in a cathode zone.

A voltage of 2.8 to 3.4 V was applied between the electrodes, and an ionic conductivity at that time of the electrolyte was measured. By this procedure, electrons ($e^-$) generated in the anode zone were allowed to transfer to the cathode zone through a lead; $N^{3-}$ was generated in the cathode zone by reception of electrons ($e^-$) by a nitrogen gas ($N_2$); and ammonia ($NH_3$) was generated through the reaction between the protons ($H^+$) that had moved toward the cathode zone from the anode zone in the electrolyte phase and $N^{3-}$. The generated ammonia was emitted from the apparatus together with the nitrogen gas that was circulated in the cathode zone.

In the ammonia synthesis method according to the example of the present invention, the chemical reactions in the anode zone and the cathode zone were as follows:

Anode reaction: $H_2O + h\nu \rightarrow 1/2 O_2 + 2H^+ + 2e^-$

Cathode reaction: $N_2 + 6e^- \rightarrow 2N^{3-}$

: $N^{3-} + 3H^+ \rightarrow NH_3$

As a result, the ionic conductivity of the electrolyte phase of the aqueous sulfuric acid solution after the ammonia synthesis reaction was reduced to 0.50 mS/cm while the ionic conductivity of the electrolyte phase of the aqueous sulfuric acid solution before the initiation of the ammonia synthesis reaction was 0.84 mS/cm, indicating that ammonia was generated.

FIG. 1

(1) $N_2$ gas
(2) Cathode (Ni porous body)
(3) Anode (ITO+TaON)
(4) Lamp irradiation

The invention claimed is:

1. A method for synthesizing ammonia, wherein an anode and a cathode are arranged in an electrolyte phase at a predetermined interval; a photocatalyst is provided to the anode; water ($H_2O$) is supplied to an anode zone and light is radiated so that water is decomposed by a photocatalytic reaction to generate protons ($H^+$), electrons ($e^-$), and an oxygen gas ($O_2$); a nitrogen gas ($N_2$) is supplied to a cathode zone, and the electrons ($e^-$) generated in the anode zone are allowed to transfer to the cathode zone through a lead, thereby generating $N^{3-}$ in the cathode zone; and ammonia ($NH_3$) is synthesized through the reaction between the protons ($H^+$) that have moved toward the cathode zone from the anode zone in the electrolyte phase and $N^{3-}$, characterized in that an anode substrate is made of indium tin oxide (ITO) or fluorine tin oxide (FTO); the cathode is a Ni porous body, a nickel-, iron-, or ruthenium-loaded Ni porous body, carbon paper, or nickel-, iron-, or ruthenium-loaded carbon paper; and the photocatalyst is a visible light-responsive photocatalyst comprising an oxynitride compound, an oxysulfide compound, or an oxide containing metal ions of $d^{10}$ electron state.

2. The method for synthesizing ammonia according to claim 1, wherein the light to be radiated to the anode zone is solar light, or visible light emitted from a light irradiation lamp.

3. The method for synthesizing ammonia according to claim 1, wherein the photocatalyst is a visible light-responsive photocatalyst comprising an oxynitride compound, wherein the oxynitride compound is TaON, $LaTiO_2N$, $CaNbO_2N$, $LaTaON_2$, or $CaTaO_2N$.

4. The method for synthesizing ammonia according to claim 1, wherein the photocatalyst is a visible light-responsive photocatalyst comprising an oxysulfide compound, wherein the oxysulfide compound is $Sm_2Ti_2S_2O_7$.

5. The method for synthesizing ammonia according to claim 1, wherein the photocatalyst is a visible light-responsive photocatalyst comprising an oxide containing metal ions of $d^{10}$ electron, wherein the oxide is $CaIn_2O_4$, $SrIn_2O_4$, $ZnGa_2O_4$, or $Na_2Sb_2O_6$.

* * * * *